Dec. 22, 1942.    G. P. KIMMEL    2,305,716
OPHTHALMIC MOUNTING
Filed Feb. 6, 1940
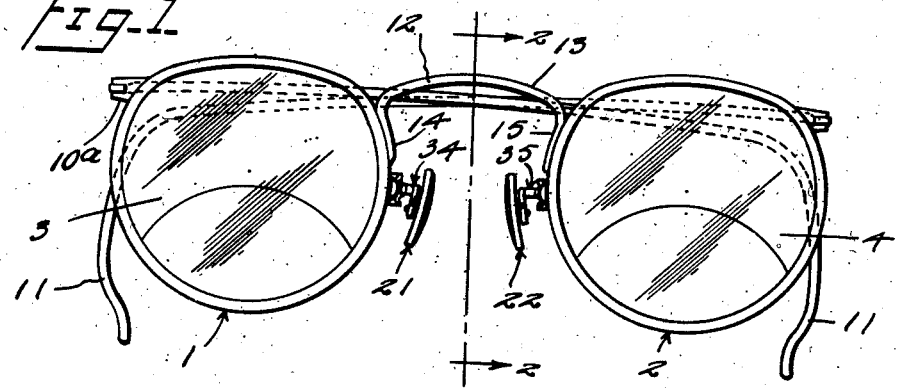
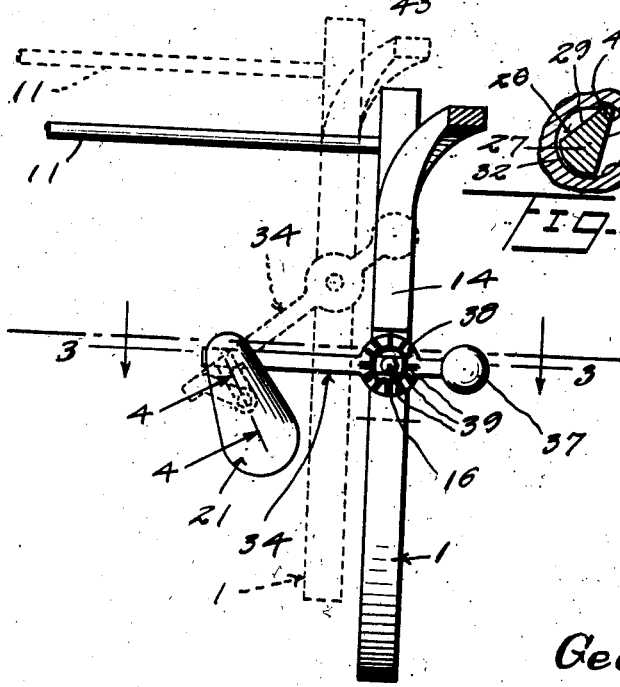
Inventor
George P. Kimmel
By Kimmel & Crowell
Attorneys Patented Dec. 22, 1942

2,305,716

UNITED STATES PATENT OFFICE 2,305,716

OPHTHALMIC MOUNTING

George P. Kimmel, Brookville, Md.

Application February 6, 1940, Serial No. 317,607

2 Claims. (Cl. 88—49)

My invention relates to an adjustable ophthalmic mounting designed primarily for bifocal lenses, but it is to be understood that a mounting, in accordance with my invention is for use in any connection for which it may be found applicable.

In the conventional bifocal lens, the reading field is ordinarily so placed and the lens so mounted that when the wearer is looking straight ahead his line of sight will pass through the distance field at a point above the reading or near vision field. In using the near vision field it is necessary for the wearer to incline his line of vision downwardly with respect to the normal straight ahead line of vision.

The above arrangement is not satisfactory under ordinary conditions, and when a person is required to view near objects directly in front of or on a level with his face, the necessary tilting of the head to enable the bifocal wearer to see through the near vision field is very unnatural, annoying and tiresome.

My invention aims to provide, in a manner as hereinafter set forth, a mounting of the class referred to for rendering bifocal lenses more adaptable in service and to overcome the aforesaid objections.

My invention further aims to provide, in a manner as hereinafter set forth, a mounting of the class referred to whereby the bifocal lenses of a pair of spectacles or eye-glasses are readily adjusted for far and near vision fields by shiftable nose pad carrier elements forming parts of the mounting, while the nose pads are in stationary supporting position on the nose of the wearer of the mounting.

My invention further aims to provide a mounting for bifocal lenses including nose pad carrier elements, and means correlated with said elements whereby the lenses may be adjusted for the desired use in the desired field while the nose pads support the mounting on the nose of the wearer.

My invention further aims to provide a mounting for bifocal lenses including adjustable nose pad carrier elements shiftable relative to the nose pads carried thereby and to the lenses for disposing the latter at the desired position for use.

My invention further aims to provide a mounting for bifocal lenses including adjustable automatically latchable nose pad carrier elements shiftable relative to the nose pads carried thereby and to the lenses, while the nose pads are disposed on the nose of the wearer to support the mounting, to thereby arrange the lenses at the desired position for use.

My invention further aims to provide a mounting for bifocal lenses including means pivotally connected with the nose pads of the mounting and with the lenses for adjusting the latter to the desired position for use.

My invention further aims to provide a mounting for bifocal lenses including oppositely disposed revoluble nose pad carrier elements pivotally connected with the nose pads and with the lenses carried by the mounting for adjusting the lenses to the desired position for use, and means for limiting the extent of the revoluble movement in opposite directions of said elements.

My invention further aims to provide a mounting for bifocal lenses including spring controlled normally latched pivotally mounted automatically latchable nose pad carrier elements for adjusting the lenses to the desired position for use while the mounting is supported from the nose of the wearer by the nose pads carried by said elements.

My invention further aims to provide a mounting for the purpose referred to which is simple in its construction and arrangement, strong, durable, compact, thoroughly efficient in use, readily assembled, distinctive and pleasing in appearance, permits of conveniently and expeditiously adjusting the lenses when desired, and comparatively inexpensive to manufacture. Embodying the aims aforesaid and others which may hereinafter appear, my invention consists of the novel construction, combination and arrangement of parts, as will be more specifically described and illustrated in the accompanying drawing, wherein are shown embodiments of my invention, but it is to be understood that changes, variations and modifications may be resorted to which fall within the scope of the invention as claimed.

In the drawing:

Figure 1 is a front elevation of an ophthalmic mounting, in accordance with my invention, of the spectacles type, Figure 2 is a section on line 2—2 Figure 1 and illustrating in full lines the normal position of the bifocal lens mounting and in dotted lines the adjusted position for viewing through the lower segment of the lenses, Figure 3 is a section on line 3—3 Figure 2, Figure 4 is a section on line 4—4 Figure 2, Figure 5 is a section on line 5—5 Figure 4, and Figure 6 is a fragmentary view in front elevation and partly in section of a mounting in accordance with my invention, with the adjustable parts applied to a rimless type.

With reference to Figures 1 to 5 of the drawing; 1, 2 indicate a pair of lens rims or eye wires, which may be constructed of metal, zylonite or any other suitable desired material. The body of each rim is of a customary substantially rectangular form in transverse section. Mounted in and connected to the rims 1, 2 are the bifocal lenses 3, 4 respectively, having the usual reading and distance segments.

With reference to Figure 3; each rim has its inner edge formed with a flared endless channel or groove 5. The latter, in the nasal side of its base wall 6, is formed with a flared countersink 7 terminating at its outer end in the inner end of an opening 8 of a contour other than circular. The opening 8 extends from the countersink 7 to the outer edge 9 of the rim. As shown, a lens will be formed with beveled corners 10 which bear against the side walls of a groove 5, and the edge of the lens will abut wall 6 and close the inner end of the countersink 7.

The temple sides of the rims are formed with oppositely disposed end pieces 10a to which are pivotally connected the outer ends of the temple bars 11. The said bars may be formed of any suitable metal or composition material. The rims are connected together by an inverted substantially U-shaped bridge 12 formed of any suitable metal or composition material. The bight of the bridge 12 is designated at 13 and its sides at 14, 15. The bight 13 is shown by way of example as of arcuate form and has its central or high part substantially aligning with the central or high parts of the tops of the rims 1, 2. The arms 14, 15 of the bridge 12 are oppositely disposed, depend from and extend inwardly with respect to the ends of the bight 13. The arms 14, 15 are secured to the upper portions of the outer edges of the rims 1, 2 on the nasal sides of the rims. The contour of the arms 14, 15 will conform to the contour of the parts of the rims to which they are secured. The lower ends of the arms 14, 15 are arranged above the openings 8 in the rims.

There is correlated with each of the rims a combined coupling and pivot forming member 16 consisting of a shank like body part 17, of a contour other than circular mounted in and extended outwardly from an opening 8, an inner head 18, integral with the inner end of body part 17, seated in the countersink 7 and of a contour and dimensions corresponding to the countersink 7, and an outer head 19 integral with the outer end of body part 17 and of segmental contour in cross section. The flat face 20 of head 19 is integral axially thereof with the outer end of body part 17. The lens has its outer edge abutting the inner head 18 to arrest the inward movement of the member 16 relative thereto. The said body part 17 is of materially greater length than the length of opening 8.

The mounting includes a pair of oppositely disposed tapered nose pads 21, 22 of like form and substantially of arcuate contour longitudinally and transversely. Each pad is formed of a flexible metallic core 23 and a suitable composition covering 24 completely encasing the core. The innerside of the covering 24, approximately centrally thereof, is formed with an opening 25 leading to the core 23. Formed integrally at its inner end with the core 23 and extending therefrom through and beyond the outer end of the opening 25, is a combined coupling, pivot and stop forming member 26 consisting of a shank 27 of a cross sectional contour other than circular and a head 28 integral with the outer end of shank 27. Preferably the cross sectional contour of the shank 27 will be wedge-shaped and formed with oppositely disposed inwardly inclined surfaces 29, 30 a squared surface 31 merging into corresponding ends of the surfaces 29, 30, and a rounded surface 32 merging into the other corresponding ends of the surfaces 29, 30. The cross sectional length of the surface 31 is materially less than the cross sectional length of the surface 32. The reduced side of the shank 27 provides a stop for a purpose to be referred to.

The mounting includes a pair of oppositely extending oppositely revoluble automatically latchable spring controlled adjustable carrier elements 34, 35 for the nose pads 21, 22 respectively. The elements 34, 35 are of like construction, each consisting of an arm 36 having a free terminal portion 37 of cup-shaped form to constitute a finger piece when adjusting, a depressed portion 38 between its transverse median and the terminal portion 37 constituting a latching member and having its outer marginal portion formed with a circular row of teeth 39, and a circular opening 40 axially of the portion 38. The arm 36 opposite its terminal portion 37 merges into the inner end of an outwardly directed incurved extension 41 disposed at right angles thereto. Each of the elements 34, 35 includes a connector 42 correlated with a member 26 for pivotally connecting the element to a nose pad. The connector 42 is disposed in parallel spaced relation to an arm 36 and consists of a flat stem part 43 merging at one end into an enlarged head part 44 in the form of an annulus. The connector 42 is positioned against the back of a nose pad and the other end of its stem 43 merges into the outer end of an extension 41. A member 26 extends through a head part 44 of the connector and couples a carrier element to its associated supporting nose pad.

The inner wall 45 of the head part 44 is formed with a groove 46 with the side walls 47, 48 of the latter constituting spaced stops for limiting the extent of the revolving of an element 34 or 35 in opposite directions. The shank part 27 of a member 26 extends through the head part 44 of a connector 42 and has its smaller side project into the groove 46 to thereby provide for a portion of the surfaces 29, 30 to correlate with the walls 47, 48 respectively of the groove 46 to limit the extent of the shifting of an element 34 or 35 in opposite directions.

The carrier elements 34, 35 are pivotally connected to the rims 1, 2 respectively, as well as automatically latchable with said rims for the purpose of releasably holding said elements in normal and adjusted positions. For the purpose just stated each carrier element has correlated therewith a non-revoluble keeper 49 of cup-shaped contour formed with a circular row of teeth and an axial opening 50. The keeper 49 is positioned against the outer edge of a rim and on the shank part 17 of a member 16. The opening 50 of the keeper is of a contour corresponding to the contour of said shank part 17.

The latching member or portion 38 of an element 34 or 35 is normally seated in the keeper 49, and the teeth of the latter correlate with the teeth of the member 38 for releasably latching an element 34 or 35 to a rim in normal and adjusted positions. The teeth of the latching member 38 are normally releasably maintained in engaged relation with the teeth of the keeper by a curved controlling spring 52 which is formed with an axial opening 53. The spring 52 is mounted on the shank part 17 of a member 16 and is interposed between the outer face of the latching member or portion 38 of an element 34 or 35 and the inner face of the head 20 of member 16. The spring 52 permanently tends to maintain the teeth of the latching member 38 in frictional engagement with the teeth of the keeper 49.

From the foregoing structural arrangement it is readily apparent that when a nose pad carrier element is revolved in an anti-clockwise direction relative to its associated rim that a lens will be elevated to position it for use for near vision and then when such element is revolved in a clockwise direction relative to the rim, the lens will be lowered to position it for use for far vision. On both movements of the carrier elements, they will pivot on the nose pads while the latter remain stationary on the nose and support the mounting. When a shifting pressure is removed from an element 34 or 35, the element automatically latches in the position to which it has been shifted.

The rimless type mounting for eyeglasses as shown by Figure 6 will be the same as the mounting shown by Figures 1 to 5, with the exception that the rims or eye wires are not employed, but in lieu thereof, a coupling piece or lens strap 54 is secured to the nasal side of each of the lenses 55 (only one shown). The piece 54 will have coupled thereto and extended therefrom a combined coupling and pivot member 16. Otherwise than that as stated, the mounting employed for rimless spectacles will be the same as used for other spectacles. In Figure 6 a nose pad is indicated at 56 and a carrier element at 57. The mounting for rimless glasses operates to adjust the lenses in the same manner as the mounting for other spectacles.

What I claim is:

1. In an ophthalmic mounting for bifocal lenses, a pair of nose pads for supporting the mounting from the nose of the wearer, spaced means for connecting lenses to the mounting, a pair of oppositely disposed adjustable oppositely revoluble carrier elements, a pivot member mounted in and extended from each of said connecting means for pivotally supporting a carrier element, intermediate its ends, from a connecting means, means for pivotally connecting one end of each of said carrier elements to a pad, each of said elements being formed with a latching member intermediate its ends and through which extends a pivot member, keepers mounted on said pivot members and correlating with said latching members for latching the carrier elements in normal position and in adjusted position, and a controlling spring common to each latching member and keeper, bearing against the latching member and mounted on a pivot member.

2. In an ophthalmic mounting for bifocal lenses, a pair of nose pads for supporting the mounting from the nose of the wearer, spaced means for connecting lenses to the mounting, a pair of oppositely disposed adjustable oppositely revoluble carrier elements each having an inturned portion, a pivot member mounted in and extended from each connecting means for pivotally supporting a carrier element, intermediate its ends, from a connecting means, the lenses connected to the mounting by said connecting means maintaining said pivot members in said connecting means, means for pivotally connecting the inturned portion of each of said carrier elements to a pad, the said inturned portions and the means for pivotally connecting such portions to the pad having correlated means for limiting the extent of the revolving movement of the carrier elements in opposite directions, each of said elements being formed intermediate its ends with a latching member through which extends a pivot member, keepers mounted on said pivot members and correlating with said latching members for latching said carrier elements in adjusted and normal positions, and a controlling spring common to a latching member and a keeper, mounted on a pivot member and bearing against a latching member.

GEORGE P. KIMMEL.